No. 740,883. PATENTED OCT. 6, 1903.
W. H. LOGAN.
RAIL JOINT FASTENER.
APPLICATION FILED JUNE 10, 1903.
NO MODEL.
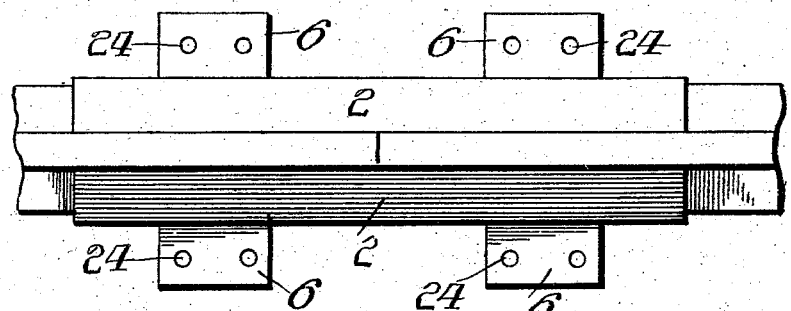
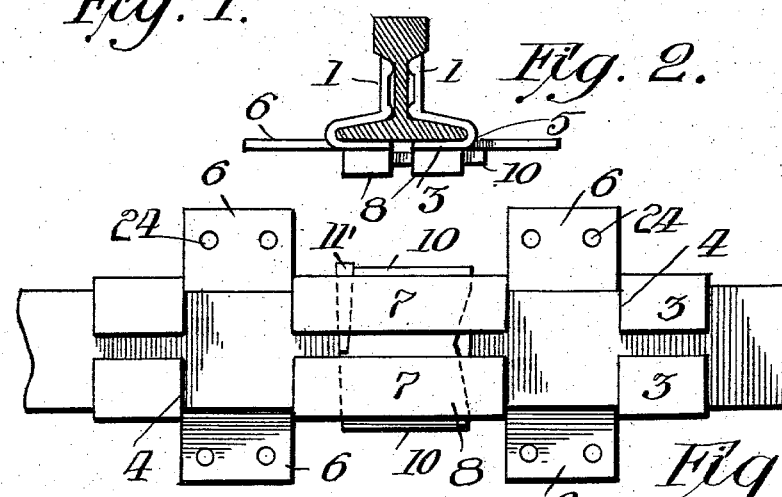
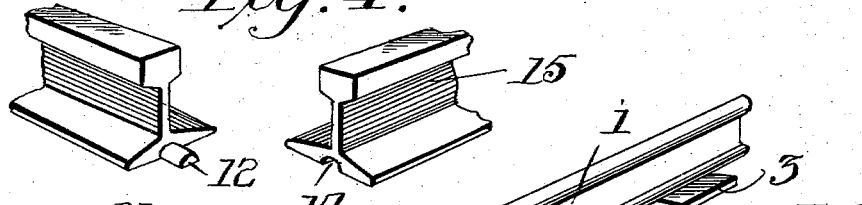
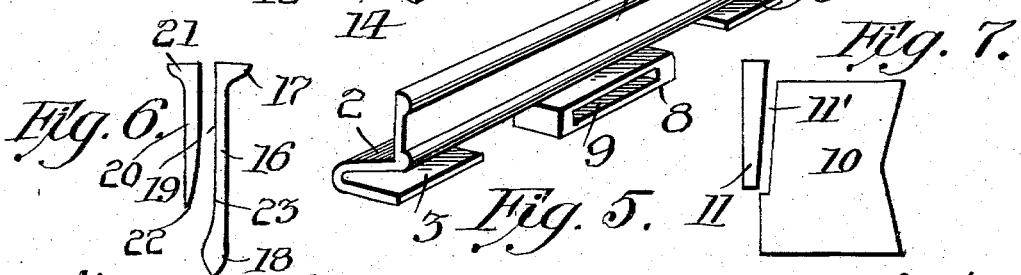
Witnesses:
J. H. Butler,
Geo. B. Rowley
Inventor,
W. H. Logan,
By N. C. Evert & Co.
Attorneys.
THE NORRIS PETERS CO., PHOTO-LITHO., WASHINGTON, D. C.

No. 740,883. Patented October 6, 1903.

UNITED STATES PATENT OFFICE.

WILLIAM H. LOGAN, OF CARNEGIE, PENNSYLVANIA.

RAIL-JOINT FASTENER.

SPECIFICATION forming part of Letters Patent No. 740,883, dated October 6, 1903.

Application filed June 10, 1903. Serial No. 160,796. (No model.)

*To all whom it may concern:*

Be it known that I, WILLIAM H. LOGAN, a citizen of the United States of America, residing at Carnegie, in the county of Allegheny and State of Pennsylvania, have invented certain new and useful Improvements in Rail-Joint Fasteners, of which the following is a specification, reference being had therein to the accompanying drawings.

This invention relates to certain new and useful improvements in rail-joint fasteners, and has for its object to construct a rail-joint fastener wherein fish-plates are employed to embrace the rail, said fish-plates fitting underneath the tread thereof and the base of the rail, said fish-plates having a struck-out lug adapted to rest upon the cross-tie and be securely spiked thereto.

Another object of my invention is to provide a rail-joint fastener which will be securely braced by fish-plates, whereby any lateral movement of the rails is prevented, and means carried by said fish-plates for securing the same together upon the sections of the rails.

A further object of my invention is to provide a rail-joint fastener of the above-described character which may be readily secured to the ties of a railroad, and any loosening of said rail-joint will have a tendency to clamp the rail-sections more securely.

Briefly described, the invention comprises an integral plate and clamp member, which receives one-half the rail-base, the base of this clamp member being cut out at one or more points and the portion thereof bent outwardly to form the base-plate adapted to lie upon the cross-tie and be rigidly spiked thereto. Upon the portion of the clamp member which lies under the base of the rail I secure two boxings, through which a suitable wedge is driven, whereby the two clamp members may be securely held together. I also provide the sections of rails with a suitable joint, whereby any lateral movement of the sections when once joined together will be prevented, and I employ a novel form of spike for securing the outwardly cut-out portions to the cross-tie.

The invention will be hereinafter more specifically described and then particularly pointed out in the appended claims, and in describing the invention in detail reference is had to the accompanying drawings, forming a part of this specification, and wherein like numerals of reference indicate like parts throughout the several views, in which—

Figure 1 is a top plan view of my improved rail-joint. Fig. 2 is an end view thereof. Fig. 3 is a bottom plan view. Fig. 4 is a detail perspective view of the ends of the sections of rails. Fig. 5 is a perspective view of one of the fish-plates. Fig. 6 is a detail view of my improved spike, and Fig. 7 is a detail view of the wedges employed to secure the fish-plates together.

To put my invention into practice, the same comprises the fish-plate and a chair to receive the ends of the rails. Where the joint of the two rail-sections is to be laid between the two ties, the device will be made of sufficient length to permit the forming of two securing-plates thereon, one for each of the ties at the side of the joint, and where the joint is made on top of one of the ties a single securing-plate may be employed. In the accompanying drawings I have illustrated this device as applicable to where the joint is laid between the ties, and in carrying out my invention I provide a fish-plate 1, the upper edge of said fish-plate adapted to engage the under side of the tread of the rail, while the outwardly-extending flange 2 thereof is adapted to be bent inwardly under the base of the rail, as indicated at 3. This portion is sheared, as indicated at 4, the sheared portion thereof being bent outwardly to form the securing-plate 6, by which the rails and rail-fastener are secured upon the tie. Formed integral with the fish-plate and preferably the central bent-in portion 7 are the boxings 8, carrying apertures or slots 9, through which is adapted to pass a wedge 10. This wedge I preferably form as illustrated in Fig. 7 of the drawings, the same being formed with a cut-out portion adapted to receive the auxiliary wedge 11. The rail-sections, as illustrated in Fig. 4 of the drawings, consist in providing one of the sections with an outwardly-extending lug 12, formed integral with the base of said rail-section, this outwardly-extending lug 12 adapted to be seated or fitted into the recess 14, formed in the base of the rail-section 15. In Fig. 6 of the drawings I have illustrated a form of spike which I desire to use, the same consisting of a spike member 16, carrying a head 17, and having a pointed end 18, the side of said spike being cut away as indicated at 19, and adapted to be seated in said cut-away portion as the auxiliary spike 20 carrying a head 21, the pointed end 22 of which is adapted to snugly fit in the cut-away portion 23 of the side of the spike 19. While I have only described one of said fish-plates, as indicated by numeral 1, it will be noted that the other fish-plate is similarly formed, as illustrated in Figs. 1 and 3 of the drawings. When it is desired to clamp or secure two rail-sections together upon the ties of a railroad, the rail-sections, as illustrated in Fig. 4, are placed together, the extending lugs 12 engaging in the recess 14 of the rail-section 15, and this operation having been performed the fish-plates 1 are secured upon each side of the rail-sections, the inwardly-extending bent portions 3 engaging the base of the rail, as illustrated in Fig. 3 of the drawings. These fish-plates are secured in position by driving a wedge 10 (illustrated in Fig. 3 of the drawings) through slots 9, formed in the boxings 8 of the central bent-in portion 7, and when this wedge has been driven in position the auxiliary wedge 11 is driven into the cut-away portion 11' of the wedge member 10. The outwardly-extending portions 6 of the fish-plates are then secured to the ties by any suitable means; but I preferably employ the form of spike illustrated in Fig. 6 of the drawings, which is driven through the apertures 24, formed in the outwardly-extending portion 6, whereby the same may be secured rigidly to the tie. While I have herein shown this manner of securing the fish-plates to the ties, it is obvious that the same may be secured thereto by using the ordinary spike and securing the outwardly-extending portion 6 to the tie by driving the spike near the edges of the portion 6, whereby the same will be securely held. It will be also seen that by my improved wedging of the two fish-plates upon the sections of the rails it will be impossible for any lateral or longitudinal movement of said fish-plates to take place, and upon a slight lateral movement of the same the wedging employed by me will have a tendency to more securely hold the same and in conjunction with the spikes which securely hold the extending portion 6 upon the ties it will be impossible for the rail-sections to become loose or disengaged from each other.

While I have herein shown and described a practical embodiment of my invention, yet it will be obvious that various slight changes may be made in the details of construction without departing from the general spirit of my invention.

Having fully described my invention, what I claim as new, and desire to secure by Letters Patent, is—

1. A rail-joint fastening consisting of a pair of fish-plates and chair, said fish-plates being formed integral with the chair, a portion of said chair being cut away and bent outwardly, said outwardly-bent portion having apertures formed therein, enlarged portions formed upon the under side of the remaining portions of the chair, apertures or slots formed longitudinally therein, a wedge comprising two members, one of said members being cut away and adapted to fit in the apertures or slots formed in the enlarged portions of the chairs, the second member adapted to fit in the cut-away portion of the first member of the wedge, substantially as described.

2. A rail-joint fastener consisting of a pair of fish-plates having a portion of their flanges bent inwardly, and boxings carried by each inturned portion of said fish-plates, said boxings being formed with transverse openings and a wedge projecting through the openings of said boxings.

In testimony whereof I affix my signature in the presence of two witnesses.

WILLIAM H. LOGAN.

Witnesses:
GEO. B. ROWLEY,
K. H. BUTLER.